United States Patent [19]

Yong et al.

[11] 4,389,420
[45] Jun. 21, 1983

[54] DOUGH GLAZE

[75] Inventors: Samuel H. Yong, Minneapolis; Donna J. Perlbachs, Edina; Glenn R. Wallin, Minneapolis; Roberta C. Houle, Champlin, all of Minn.

[73] Assignee: The Pillsbury Company, Minneapolis, Minn.

[21] Appl. No.: 262,582

[22] Filed: May 11, 1981

[51] Int. Cl.³ .............................................. A21D 13/00
[52] U.S. Cl. ........................................ 426/94; 426/128
[58] Field of Search ................. 426/94, 549, 576, 578, 426/653–654, 496, 128, 302, 573, 583, 118

[56] References Cited

U.S. PATENT DOCUMENTS 2,187,354  1/1940  MacManus ........................... 426/496
3,088,829  5/1963  Rapaport .............................. 426/94

FOREIGN PATENT DOCUMENTS 1443892  7/1976  United Kingdom ................ 426/549

*Primary Examiner*—Raymond N. Jones
*Assistant Examiner*—Elizabeth A. Hatcher
*Attorney, Agent, or Firm*—Michael D. Ellwein; Robert J. Lewis; Mart C. Matthews

[57] ABSTRACT

A glaze is provided which can be used on a refrigerated dough contained in a container and adapted for storage in a refrigerated dough case. The glaze is so formulated that it will remain on the surface of the dough and provide a glaze on the exterior of the bread product made from the dough after baking.

10 Claims, 8 Drawing Figures

DOUGH GLAZE

BACKGROUND OF THE INVENTION

Refrigerated dough or fresh dough, i.e., dough contained in a container and sold out of the refrigerated case at the grocery store, has long been a popular item. Typically, the dough is chemically leavened and formulated for storage in containers which will maintain the pressure generated by the leavening action of the leaveners in the dough. All a cook need do to prepare biscuits or the like from the contained dough is to open the container and place the dough in the oven and bake.

Attempts have been made to provide such doughs which can be used to make a loaf bread. However, one problem with such products was that upon baking, the exterior had a dry and unappealing look. By contrast, bakeries and the like provide bread products that have a high sheen produced by a glaze compound applied to the exterior of the dough prior to baking. Typical of such glazes is an egg-wash. Attempts to use such a glaze compound were unsuccessful since the glaze compound was absorbed into the dough. Upon baking of the dough, there was no sheen on the baked loaf.

It was unexpectedly found by having a glaze compound with a certain viscosity, that it would not be absorbed into the dough product during storage and thus upon baking of the dough, a high sheen resulted on the exterior of the baked loaf.

OBJECTS OF THE PRESENT INVENTION

An object or the present invention is to provide a fresh dough product having a glaze compound thereon which upon baking, will provide a high sheen to the baked product. Another object of the present invention is to provide a glazing compound which will not be absorbed into the dough product or otherwise lost during refrigerated storage of the dough.

Other objects and advantages of the present invention will become apparent from the following detailed description taken in connection with the accompanying drawings wherein are set forth by way of illustration and example certain embodiments of the present invention.

DETAILED DESCRIPTION OF THE INVENTION

Figure 1:
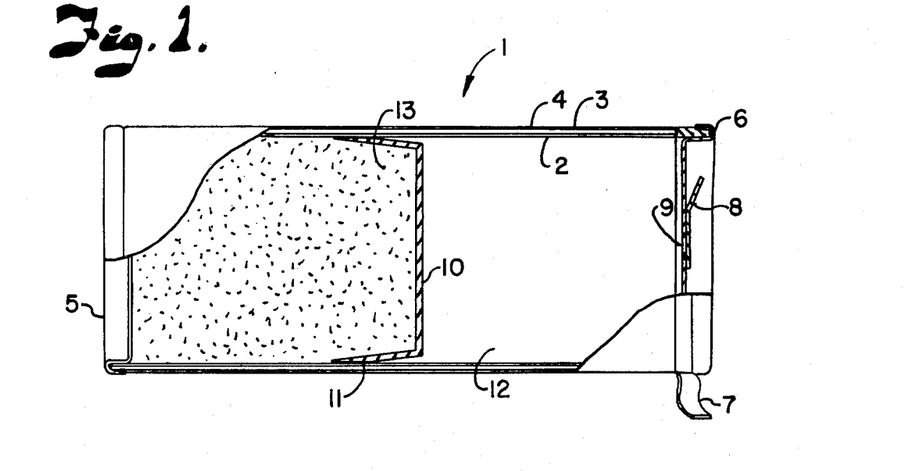
FIG. 1 is a fragmentary sectional view of one form of container to achieve slow pressure release.

The reference numeral 1 designates generally a tubular container having a side wall comprised of an inner liner 2, a body wall 3 and a label 4. These components can be helically wound or spirally wound as is known in the art and they can be of any suitable material as is known in the art. One end of the container 1 is closed in a well-known manner with a closure 5 as is known in the art. The opposite end of the container 1 also has a closure 6 sealed to the container 1 in a manner well known in the art as, for example, like an orange juice can wherein a peelable ribbon 7 can be removed allowing the closure 6 to be removed from the end of the container 1. A seal means such as a tab 8 is suitably secured, such as adhesively, to a portion of the closure 6 and seals an aperture 9 which is through the closure 6. By removal of the tab 8, the aperture 9 provides flow communication between the interior of the container 1 and the atmosphere.

A piston or plunger 10 is slidably received within the interior of the container 1 and has a flange 11 in frictional engagement with the liner 2. Sufficient friction can be provided between the flange 11 and liner 2 so as to control or help control the rate of movement of the piston 10 when the tab 8 is removed allowing a pressurized fluid such as air or oil contained in the chamber 12 to be vented through the aperture 9. The fluid in the chamber 12 is pressurized by leavening action of the leaveners in the dough 13. Further, the size of the aperture 9 is suitably chosen so as to control the rate of discharge of the pressurized fluid. It is preferred that the pressure release rate be less than about 10 psi per second. Preferably, the pressure release rate is less than about 5 psi per second and more preferably less than about 3 psi per second. This time rate is determined by taking the amount of internal container (gage) pressure released and dividing it by the time required for reducing the pressure to atmospheric.

To operate, the tab 8 is removed allowing the chamber 12 to communicate with the atmosphere for discharge of the pressurized fluid. After the fluid is vented from the container 1, the ribbon 7 is removed allowing the dough product 13 to be removed from the container 1.

Figure 2:
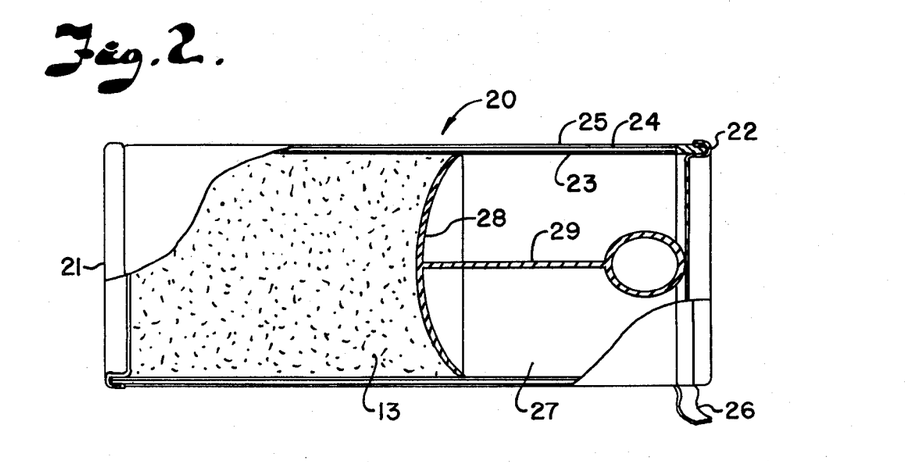
FIG. 2 is a fragmentary sectional view of a modified form of the invention.

FIG. 2 shows a modified form of the present invention wherein the reference numeral 20 designates generally a tublar container having end closures 21 and 22 as is known in the art. The tublar portion of the container 20 is comprised of an inner liner 23, a body wall 24 and a label 25. These members can be helically or spirally wound as is known in the art. The container 20 has a peel ribbon 26, e.g., a ribbon similar to a Micra Strip found on orange juice cans, which, upon removal, allows separation of the closure 22 from the side wall. Positioned in a chamber 27 is a plunger arrangement having a plunger head 28 which is concave relative to the chamber 27 and convex relative to the portion of the container 20 containing the product 13. The plunger arrangement 28 also has a grasping member 29 connected to and preferably integral with the head 28. By grasping the member 29 when the closure 22 is removed, the head 28 will be reversed in curvature and by having the peripheral edge of the head 28 in frictional engagement with the liner 23, the release rate of pressure can be held within the limits described above.

Figure 3:
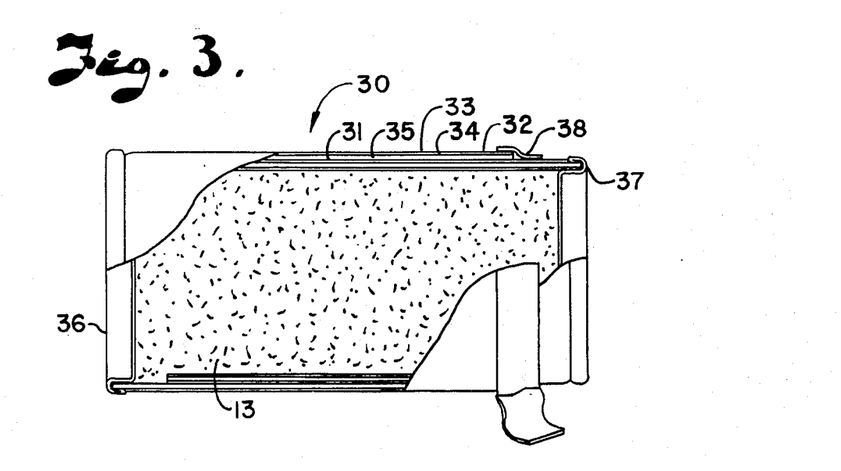
FIG. 3 is a fragmentary sectional view of another modified form of the invention.

FIG. 3 shows another modified form of the present invention wherein 30 designates generally a tubular container of a telescoping type. The container 30 has one side wall portion 31 received within an outer side wall 32 and is in frictional engagement therewith. Each of the side walls 31 and 32 can be of similar construction having a label layer 33, a body wall layer 34 and a liner 35. However, the wall 31 would not always need a label layer and in some circumstances the wall 32 would not need a liner layer. Each of the side wall portions 31 and 32 also have respectively connected thereto in a suitable manner a tear tape 38. As shown, the tear tape 38 is adhesively connected to both side walls 31 and 32 preventing their longitudinal separation. By removal of the strip 38, the pressure of the product 13 will urge the sections 31 and 32 to longitudinally move relative to one another at a controlled rate due to the friction between the wall sections 31 and 32. It has been found advantageous to wrap the dough in one or more wraps of a film such as mylar to facilitate handling upon removal. Preferably the wrap (not shown) would cover the entire length and ends of the dough while in the container 30. A friction material such as lower shear strength adhesive can be positioned between the walls to help control opening movement. The rate of pressure release will be held within the limits described above.

Figure 4:
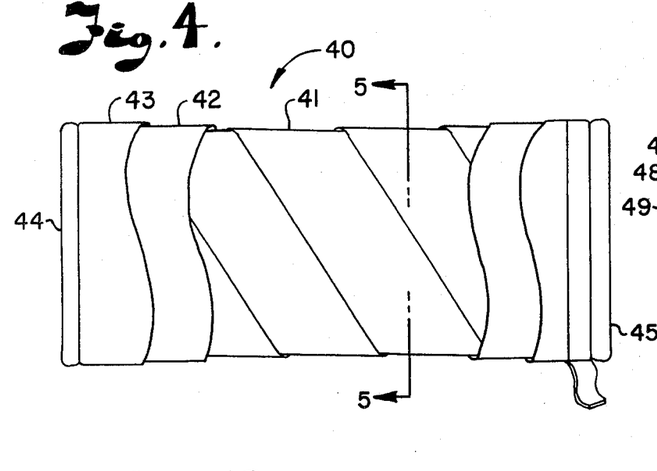
FIG. 4 is a fragmentary sectional view of another modified form of the present invention.
Figure 5:
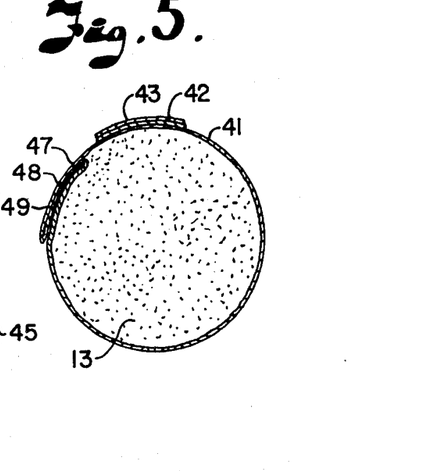
FIG. 5 is a sectional view taken along the line 5—5 of FIG. 4.

FIGS. 4 and 5 shown another modified form of the present invention. In the form shown in FIGS. 4 and 5, a container 40 is comprised of a liner 41, a body wall layer 42 and a label layer 43 constructed as is known in the art. Opposite ends of the container have closures 44 and 45 as is known in the art. In the form of the invention shown, the liner is helically wound as are the body wall 42 and label 43. By removal of the label 43, as is known in the art, the container 40 will open in a manner of a self-opening container such as that disclosed in U.S. Pat. No. 4,073,950. The liner 41 has a pleat therein which preferably is helical along the length of the liner 41 and is comprised of an outer fold 47 and intermediate fold 48 and an inner fold 49. Upon opening of the container, the pleat will begin to unfold due to product pressure at a rate to keep the pressure release within the limits described above. It is to be noted that an adhesive or the like can be provided between the folds 47/48 and/or 48/49 to help control the rate of pressure release.

Figure 6:
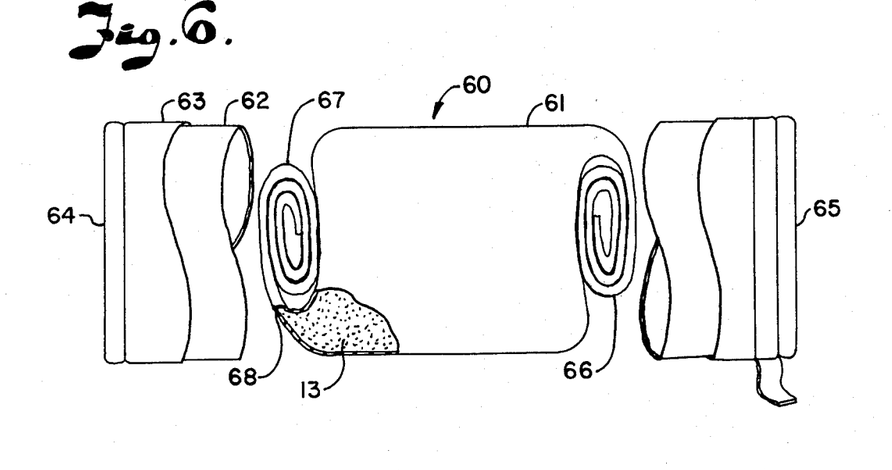
FIG. 6 is a fragmentary sectional view of another modified embodiment of the present invention.

FIG. 6 shows another modified form of the present invention wherein the reference numeral 60 designates generally a tubular container comprised of an inner chub 61, if desired, an inner liner (not shown), a side body wall 62 and a label 63. The container 60 also has end closures 64 and 65 as is known in the art. The body wall 62 and label 63 preferably can be helically wound as is known in the art.

The chub 61 can be of any suitable material such as polyester or other plastic film or foil or combinations thereof and contains the product 13 therein. The chub 61 should have vent means (not shown) such as perforations to allow escape of gases created during leavening so that the gases can escape from the chub 61 and the container 60. Opposite ends of the chub 61 are rolled or otherwise folded as at 66 and 67 to provide expansion space for the product 13 when the container is opened. The container 60 can be opened like a typical helically wound container, that is, by removing the label 63 allowing the body wall 62 to separate along a helical butt joint. Upon opening of the container 60, the chub 61 can be removed allowing the product 13 which is pressurized to expand the chub 61 at the ends 66 and 67 at a rate as described above. This rate of expansion can also be controlled, as, for example, by having adhesive between the layers at the ends 66 and 67 as at 68 or by controlling the pressure release rate via a perforation such as one of the vent means.

Figure 7:
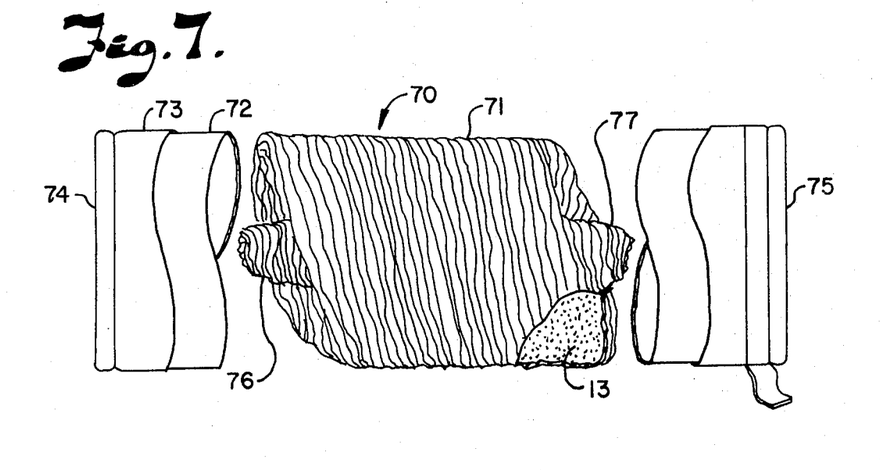
FIG. 7 is a fragmentary sectional view of still another modified form of the present invention.

FIG. 7 shows still another modified form of the present invention wherein the reference numeral 70 designates generally a container comprised of a chub 71, can liner (not shown—optional), a body wall 72 and a label 73. The container 70 has enclosures 74 and 75 as is known in the art. Preferably, the body wall 72 and label 73 are helically wound as is known in the art. The chub 71 can be of a material such as aluminum foil which has sufficient resilience and strength once folded to provide resistance to opening or expansion effected by pressure of the product 13 contained in the chub 71. Opposite ends 76 and 77 of the chub are twisted or otherwise folded and provide expansion room for the product 13 when the chub 71 is removed from the container 70. Removal of the chub 71 can be effected by removing the label 73 allowing the body wall 72 to separate along a helical butt joint as is known in the art. Upon separation along the butt joint, the chub 71 can be removed from the container 70 and allowed to expand under the influence of the pressure of the product 13. The rate of expansion is controlled within the limits as described above.

It was surprisingly found that by wrapping the dough with a film wrap prior to inserting into a container that specific volume of the baked dough was substantially increased. Such a discovery can be utilized to either have a substantially increased specific volume using the same level of leavener or can be used to achieve a higher than normal specific volume while using less leavener.

It was found that this increase in specific volume can be attributed to two factors, either of which can be utilized separately to increase specific volume or both can be utilized together. The first is related to the $CO_2$ gas permeability through the film wrap, and the second is restraining the raising of the dough after removal from the container.

The wrap can be utilized in a manner similar to the plastic film shown as the chub 61. However, it is not necessary to have the ends closed. In fact, it is more desirable to have the wrap in the form of an open-ended tube surrounding all but the ends of the dough. In this regard, it is preferable to have the wrap overlap itself generally along a generally longitudinally extending overlapping section and be sufficiently overlapped so as to restrain radial expansion of the dough after removal from the can forcing the dough to expand longitudinally. Preferably this amount of overlap is at least about the 25 percent, more preferably at least about 50 percent, and most preferably at least about 100 percent of the circumference of the dough mass (which is the same as the inside diameter of the can). With the use of the wrap, it is preferred that the diameter of the dough mass immediately upon removal from the can, i.e. the same as the inside diameter of the container, be between about $\frac{1}{2}$ inches and about 3 inches, more preferably between about $1\frac{1}{2}$ inches and $2\frac{1}{2}$ inches; and most preferably between about $1\frac{3}{4}$ inches and $2\frac{1}{4}$ inches.

It is believed that the reason for the contribution of the restraining of the radial expansion of the dough after removal from the can to the specific volume is that this allows better and more immediate heat transfer to the center of the dough mass during baking. Upon baking the dough, heat penetrates faster to the core of the dough than with a larger diameter, thus creating more expansion by the release of $CO_2$ of the dough at its core before the crust sets the loaf's size. The film wrap, therefore, has the end result of utilizing more of the expansive power of the $CO_2$ in the dough to increase the loaf's volume. Also, more rapid heat transfer to the center of the product results in more moisture loss during baking.

By way of example, it has been observed that unwrapped dough when removed from a spirally wound dough can, expands in both its radial and longitudinal dimension and expands from a packed length of $7\frac{1}{4}$ inches to 9 inches after removal. When the same dough is wrapped in a film, with one and one-half to two wraps around the dough, the expanded dough length is $9\frac{1}{2}$ to 10 inches. With unwrapped dough, the loaf after baking has a length of about $9\frac{3}{8}$ inches. Wrapped dough however, maintains its expanded length or slightly decreases resulting in a $9\frac{1}{2}$ inch loaf, but with a greatly expanded loaf diameter that results in significant increases in loaf specific volume.

When using the wrapped dough in a telescoping can such as that shown in FIG. 3, even better results are obtained. A can having an original length of $7\frac{1}{4}$ inches, having a wrapped dough therein, produces a dough length of about $11\frac{1}{2}$ inches after opening. The dough bakes to a loaf length of about $11\frac{1}{2}$ inches. Such a loaf has a specific volume as high as 4.94 as compared to the same dough in a spirally wound can without wrap which produces a loaf with a specific volume of up to about 4.2 cc. per gram.

The other factor in achieving higher specific volumes is a reduction of $CO_2$ gas loss from the container during storage. By properly selecting the film for $CO_2$ permeability and the number of wraps, higher specific volume can be achieved. It is to be understood that a lower $CO_2$ gas permeability in a thin film can be tolerated if more wraps are used. The average $CO_2$ permeability (as measured by ASTM D1434) for the film when including the number of wraps, should be less than about 200 cc./100 sq. inch/24 hours/atmosphere at 25° C., preferably less than about 100 cc./100 sq. inch/24 hours/atmosphere at 25° C. and most preferrably less than about 50 cc./100 sq. inch/ 24 hours/ atmosphere at 25° C.

A preferred film is $\frac{3}{4}$ mil polyester. In use, the dough is removed from the can, confined in the film wrap and after an initial expansion period of about $\frac{1}{2}$ minute, the wrap is removed either before or after placing the dough in its baking container. The dough is then baked. The following table shows the results of using film wrap as opposed to no wrap.

| % Soda In Dough | Average Specific Volume (5 samples) | | | Film Thickness (mils) | No. of Wraps |
|---|---|---|---|---|---|
| | No Wrap | Wrap | Wrap Size & Material | | |
| 1.0 | 3.83 | 4.14 | 14 × 14 Polyester | $\frac{3}{4}$ | $2\frac{1}{4}$ |
| .75 | 4.09 | 4.59 | 14 × 14 Polyester | $\frac{3}{4}$ | $2\frac{1}{4}$ |
| | | 4.47 | 10 × 10 Polyester | $\frac{3}{4}$ | $1\frac{1}{2}$ |
| | | 3.62 | 10 × 10 Polypropylene | 1 | $1\frac{1}{2}$ |
| | | 3.14 | 10 × 10 Polyethylene | 1 | $1\frac{1}{2}$ |
| .75 | 3.85 | 4.08 | 10 × 12 Polyester | $\frac{3}{4}$ | 2 |

Permeabilities:

Polyester—15-25 cc/100 sq. in./mil. thickness/24 hrs./Atm. at 25°

Polyethylene (LD)—2700 cc/100 sq. in./mil. thickness/24 hrs./Atm.

Polypropylene—540 cc/100 sq. in./mil. thickness/24 hrs./Atm. at 25°

| % Soda In Dough | Control-Spiral cans W/o Wrap | Telescoping W/Wrap | Wrap Size & Material | Film Thickness (mils) | No. of Wraps |
|---|---|---|---|---|---|
| 1.0% | 3.73 | 4.08 | 14 × 14 Polyester | $\frac{3}{4}$ | $2\frac{1}{4}$ |
| .75% | 4.09 | 4.58 | 10 × 10 Polyester | $\frac{3}{4}$ | $1\frac{1}{2}$ |
| .75% | 3.85 | 4.28 | 10 × 12 Polyester | $\frac{3}{4}$ | 2 |

Figure 8:
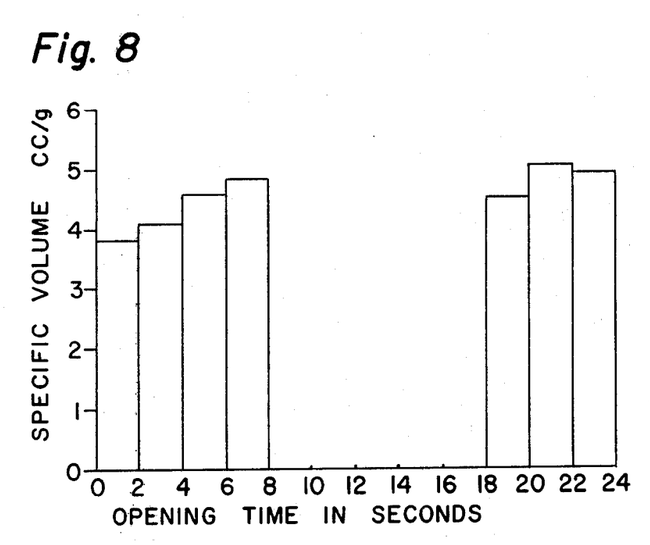
FIG. 8 is a bar graph showing a functional relationship between opening time and specific volume.

FIG. 8 illustrates a functional relationship between specific volume and opening time (this can be correlated to pressure release rate as well and is indicated also on the graph). The release rate was determined by dividing the container pressure by the time required to open the container. The data was gathered by utilizing a container similar to that shown in FIG. 1 in which the fluid in chamber 12 was oil. Also, the dough formula was the same in all cases and was stored for 7 days at a temperature of approximately 40° F. before opening. The time of opening was varied by changing the size of the aperture in the end closure.

Baking of the dough after release from the container was accomplished at 350° and was baked immediately upon removal from the container, i.e., within 5 minutes of removal from the container.

It can be seen from FIG. 8 that there is no statistical difference between instantaneous opening, and less than about 2 seconds (the container pressure in these experiments was about 15 psi to 20 psi). However, it can be seen that by slightly extending the opening time to at least about 2 seconds, that a substantially higher specific volume can be achieved. This significant increase in specific volume is indicated by the sharp rise in the bars showing a functional relationship between specific volume and opening time.

In the present invention, chemically leavened formulae have been developed which provide good results. (The formula need not be totally chemically leavened.) The dough is self supporting and pliant. The fresh dough formula is a farinaceous flour-based formula and contains flour, water, shortening, chemical leaveners, sugars, salt, edible alcohol (e.g. ethanol) and may also contain emulsifiers, dough conditioners (such as potassium bromate or ascorbic acid), flavoring materials (such as yeast flavor) and/or may contain other ingredients as known in the art.

The following tabulation provides preferred formulation contents.

| Ingredient | Range % (Approximate) | Preferred % for Bread (Approximate) |
|---|---|---|
| Wheat flour (hard preferred for bread) | 47-58 | 52-56 |
| Water | 28-36.5 | 28-36 |
| Saccharides | 4-10 | 4-8 |
| Salt | 1.0-1.5 | 1-1.5 |
| Flavoring | 1.0-7 | 2-7 |
| Emulsifiers | 0.02-1.1 | 0.02-0.3 |
| Dough Conditioners | 0.005-.25 | 0.005-0.02 |
| Bicarbonate of Soda | 0.7-1.2 | 0.7-1.2 |
| Leavening Acid | 1.3-2.5 | 1.3-2.5 |
| Shortening | 2-25 | 3-6 |
| Edible Alcohol | 0-2 | 0-2 |
| Calcium Carbonate | 0-1 | 0-1 |

Porportions are by weight of dough.

Problems to date with selecting a leavener is that the blander leaveners are faster acting making them impractical or impossible to use on line because too much rise occurs during on-line processing which adversely affects packing density and physical packing of the fresh dough into a container as well as specific volume in the baked product. However, the use of slower-acting phosphate leaveners will result in an off taste which is objectionable to consumers.

Even in view of their shortcomings, it is desired to use chemical leavening because of the control one can achieve and because of the reduced leavening time required over the use of yeast as a leavener. The selection of one type of leavener i.e. phosphate and non-phospate, over another type of leavener resulted in the sacrifice of either flavor or line time. By use of the invention, organic acid leaveners which are relatively bland (and are fast acting, e.g. citric acid, glucono delta lactone (GDL), fumaric acid or any other organic acid can be effectively used. Also, the non-bland leaveners (e.g. phosphate based) can also be used as can any chemical leavener. For improved performance of the dough during baking, it is desirable to pack the product into the can with at least 0.35% by weight of dough unreacted soda as one of the leaveners.

In order to use the preferred leaveners, the method of incorporating the particular leavener into the dough is of importance because of the fast reaction time of the blander leaveners. Surprisingly, it has been found that not mixing the leaveners into the flour/water matrix, but keeping the leavener substantially isolated therefrom, provides good line time characteristics and also does not adversely affect the baked product's specific volume. It is preferred that one or both leaveners be introduced into the dough system such that it is in contact with the flour/water matrix and/or shortening. Both the flour/water matrix and shortening can be considered continuous phases in the dough system and as separate components.

In order for the leaveners to produce leavening gas the leavening acid and leavening base are in reactive contact. In present chemically leavened dough systems the acid and base need to be solubilized in water for the reaction to occur. Thus, to prevent the reaction it has been found that by keeping at least one of the required materials for the reaction isolated from the remainder that the reaction will not take place. However, by keeping them isolated in certain manners the reaction can be delayed and not totally inhibited. What is meant by substantially isolated is that at least one or more of the required materials for reaction is kept isolated from the remainder in such a manner that after sheeting is completed that at least about 40% of the acid and base are unreacted and preferably at least about 50% and most preferably in the range of between about 60% and about 85% is unreacted.

The following methods are operable to achieve substantial isolation.

Two methods of incorporating the leavener can be done when forming a laminated dough, which is the preferred embodiment of the present invention, such as, for example, by sheeting on a Rheon stretcher or conventional rollstand. This will form alternating layers of flour/water matrix and shortening.

The number of layers of shortening interspersed within the flour/water matrix can vary from 4 to 1000—the preferred number of layers will be dependent upon the final thickness of the dough sheet. The shortening layers can vary from about 0.001 mm to about 0.040 mm, more preferably from about 0.001 mm to about 0.020 mm and most preferably from about 0.001 mm to about 0.010 mm in thickness. Flour/water matrix layers can vary from about 0.010 mm to about 0.750 mm, more preferably from about 0.020 to about 0.550 mm and most preferably, from about 0.030 mm to about 0.450 mm in calculated thickness. Very thin layers of both shortening and dough are not desirable because the leaveners react too quickly, decreasing the density of the dough to the point where it is difficult to pack into the can. The thicknesses are determined by calculation given the quantity of shortening or flour/water matrix, the number of layers and the area of the layers and is an average thickness. Very thick layers of shortening and flour/water matrix are also not desirable because the leaveners remain encapsulated in the shortening through the shelf life of the product and do not react with the dough layers to provide the desired leavening action. Additionally, the presence of unreacted leaveners in the product during baking results in large voids and/or unsightly brown areas within the baked crumb and, the unleavened dough layers form dense, gummy rings in the baked crumb.

When using a lamination process the leavener can be incorporated by sprinkling one or both of the leaveners onto the shortening after it is applied to a surface of the flour/water matrix and prior to laminating the shortening and leavener into the dough. During lamination, it is preferred that the dough mass be sheeted which can be accomplished by the use of the Rheon machine or conventional roll stands, in effect finely dispersing the leavener and shortening into the dough matrix.

Another method of incorporating the leaveners in a lamination process is to mix one or both of the leaveners with the shortening prior to distributing the shortening onto the surface of the flour/water matrix. The dough is then subsequently laminated in a typical manner. Of the methods of incorporation disclosed herein, the preferred embodiment is mixing the leaveners into the shortening prior to lamination. This gives the longest line time and thus, faster acting leaveners could be used with this method.

Another method of incorporating leaveners which can be used in processes which can include or not include lamination is to mix one or both of the leaveners with the shortening prior to mixing the shortening into the flour and water. Dough mixing is completed in the usual manner except that shortly (about 1–3 minutes) before the completion of mixing, a shortening/leavener mixture is added to the dough. The very short mixing time allows distribution of the leaveners and shortening through the dough, but is inadequate to blend these ingredients thoroughly into the flour/water matrix and substantially prevents contact of the leavener with the flour/water matrix. The dough can then be subsequently sheeted and folded in a typical manner to complete the dispersion of the shortening and leaveners in the flour/water matrix.

A still further method of incorporating leaveners is to sprinkle one or both of the leaveners onto the flour/water matrix or dough after forming the flour/water matrix and prior to placing the dough into a container. This can be done without or with laminated doughs. Preferably the leavener(s) is sprinkled on the flour/water matrix during or after sheeting or just prior to the end of the sheeting process. If the dough is laminated the sprinkling is preferably done after lamination is complete. In this method the shortening can be incorporated in the flour/water mixing step or by lamination or a combination of both.

It is to be noted that combinations of the above methods of incorporation can also be used.

The texture of the finished product is an important attribute for consumer acceptance. It has been found that by the use of laminating of the dough, the texture of baked products can be improved. This was surprising since lamination is used to tenderize and/or form noticeable layers in finished bakery products e.g. Danish. By laminating as described above such that shortening and flour/water matrix are interspersed in layers, the baked product exhibits greater resiliency, little if any noticeable layering and has a more bread like cell structure. After lamination, the dough is prepared for insertion into the can. The dough can be sheeted to a final pad thickness of 2–10 mm, cut, and the dough pad is then misted with a water based spray and rolled or otherwise formed into a cylinder. The water spray prior to rolling facilitates mending of the texture of the dough and eliminates a rolled appearance in the final loaf.

Alternatively, the dough can be sheeted to 30–50 mm thickness, the final thickness varying with can size, and the dough is cut to an appropriate width to allow insertion into the can.

It is preferred that the dough be inserted into containers prior to rising more than about 40% by volume. Preferably, the packing density after proofing in the containers is between about 1.15 g/cc and about 0.61 g/cc, more preferably between about 1.0 g/cc and about 0.70 g/cc and most preferably between about 0.87 g/cc and about 0.80 g/cc. After proofing the container should have a gage pressure of at least about 5 psi preferably at least about 10 psi and most preferably at least about 15 psi.

The ranges of packing density described are important to ensure physical stability of both the dough and the package. At too low packing densities, the dough is too fragile to handle upon opening of the package. At too high packing densities, excessive gas pressure development will result in rupture of the package during storage or transport. The high pressure results from the quantity of leavening gases which would be present in the large mass of dough in the package at high packing density.

Preferably, before inserting the dough into the container, one or more cuts are made into the surface of the dough to a depth of approximately 25–60% of the diameter or height of the raw dough at the time it is cut. Such cutting improves the appearance of the baked product and also allows increased escape of moisture during the baking process, resulting in a product of improved texture. Preferably the cutting is done with an oil coated blade so the surfaces defining the cut will not adhere to one another.

As lamination is the preferred mode of this invention for producing bread like texture, the selection of shortening is important. Preferably the laminating shortening is present in an amount of less than about 10% more preferably less than about 8% and most preferably between about 2% and about 6% by weight of dough for laminated dough. A particularly good shortening for laminated dugh has been a soybean/tallow blend available as a blended oil from Humko (#EXP 106-3) and votated as known in the art. Typically, in the selection of a shortening, one would want to select a shortening on the basis of solids fat index and suitable plasticity.

The following chart shows possible solids ranges at various temperatures for laminated shortenings.

| Temp. °F. | acceptable | | more preferably | | most preferably | |
|---|---|---|---|---|---|---|
| 50 | 36 | 60 | 40 | 58 | 46 | 56 |
| 70 | 23 | 55 | 26 | 53 | 36 | 51 |
| 80 | 21 | 52 | 24 | 50 | 32 | 48 |
| 92 | 14 | 42 | 15 | 40 | 20 | 35 |
| 100 | 10 | 31 | 12 | 30 | 15 | 26 |
| 104 | 2 | 22 | 8 | 20 | 12 | 20 |

Yeast flavor can be added to the dough to enhance the aroma and taste of the end product. Typically, yeast flavor can be added by addition of a compounded flavor or utilization of a pasteurized yeast brew to replace all or some of the dough water.

It has been discovered that the dough containing edible alcohol provided herein exhibits excellent stability, because of the edible alcohol, against microbial growth even when stored for several weeks in a pressurized container at temperatures below 50° F. Unlike previous refrigerated dough, the present doughs are suitable to be stored for several weeks in a pressurized container at an internal can pressure of about 1 to about 25 psi without unacceptable spoilage. After several weeks of storage, the leavening activity of the refrigerated dough is sufficient to provide a baked product with excellent grain, texture and volume. As a result, the homemaker is provided with a dough which need only be removed manually from the can and placed in a pan and baked.

The monosaccharide, leavening, alcohol and salt reduce the amount of free or available moisture within the dough product. Since microbial growth is dependent upon available water, the dissolved solutes help reduce the amount thereof and thus provide a microbiologically stable product. The alcohol alone is, however, most effective in this respect. The alcohol is preferably mixed with the egg yolk, (when used) before it is diluted. In addition to inhibiting microbial growth, the alcohol also appears to aid in preventing migration and/or syneresis of the water within the dough product. From a dough functionality viewpoint, the alcohol preferably in combination with egg yolk (when used) contributes markedly to its storage stability but especially to the volume of the finished baked goods.

The carbon dioxide generated by the reaction of the leavening acid and base within the dough is retained in the form of minute gas sites. This is functionally important because uniform dispersion of the carbon dioxide (small gas sites versus large gas sites) throughout the dough product supplements the alcohol in reducing subsequent microbial growth and in providing a suitable finished baked volume.

The egg yolk (solids) when used should be present in the amount of about 0.5–3% but preferably from 1.5 to 2.5% of the dough and it has been found that the egg yolk performs synergistically with the alcohol when used in the amount of about 2 parts egg yolk solids with 3 parts alcohol.

The amount of monosaccharides contained in the dough composition may range from about 1–5%, preferably from about 2–4% by weight. Any of a variety of edible commercially available monosaccharides can be used including glucose (dextrose), galactose, mannose and fructose (levulose). Other monosaccharides can, of course, be used if commercially available including monosaccharides such as erythrose, arabinose, xylose, ribose, lyxose, gulose, idose, talose, altrose, allose, sorbose and tagatose.

It has been found that the addition of divalent or trivalent ionic compounds such as calcium or aluminum ionic compounds e.g. $CaCO_3$ calcium chloride or SALP or combinations thereof that the perception of gumminess can be reduced. It is unclear why this occurs and is unexpected. The ionic compound is added in an amount to reduce gumminess to an acceptable level. Preferably ionic compound is added in an amount of less than about 1% by weight of dough and more preferably less than about 0.5% by weight.

In order to enhance the aesthetics of the dough after baking, it is desirable to have a glaze on the exterior surface. However, it was found that when utilizing an egg wash glaze, which is a typical glaze used on bakery bread, that the glaze was absorbed into the dough during storage. It has been found that by providing a glaze such as that described below, the problem of shelf life being detrimental to glaze has been overcome.

A typical bakery glaze is an egg wash made by mixing 50 parts each of egg white and water. This is commonly applied to the bread and sweet goods prior to or during baking to produce an attractive, shiny appearance. However, when such an egg wash is applied to refrigerated dough products prior to canning, its ability to produce a shiny appearance upon baking deteriorates rapidly during storage as, for example, the shelf life of such a wash would be less than about 2 days.

The invention glaze is a stabilized glaze which will impart a shiny appearance to a baked refrigerated dough without the consumer having to brush egg wash on the dough before or during baking. The glaze exhibits good shelf life properties and has been found to give desired shiny appearance through the 90 day expected storage life usually associated with refrigerated dough products.

The glaze is a proteinaceous glaze in liquid form. Protein can be any suitable protein such as gelatin, egg albumin, whey protein concentrate, casein or combinations of proteins. Typically, the protein content in the glaze wash is in the range of between about 4% and 25% by weight, preferably between about 6% and 15% by weight and most preferably between about 8% and 15% by weight. The remainder of the glaze wash is a liquid carrier such as water, oil or combination of liquids.

Typically, the glaze can be sprayed or rolled onto the dough at about 0.01 to about 0.005 g/cm² or approximately 1-2 grams of glaze on a 300 gram piece of dough.

The glaze of the present invention as disclosed above is proteinaceous and forms an emulsion or mixture with the carrier fluid. In order to provide adequate shelf life, it has been found that the viscosity of the glaze should be above about $10^5$ centipose preferably above about $10^6$ centipoise more preferably above about $10^7$ centipoise as measured at 5.5° C. Typically, an egg wash has a viscosity of less than about 10 centipose at the measuring temperature and does not produce any sheen on a product at the end of a 90 day shelf life.

By way of example, a glaze was prepared using the following ingredients by weight percent: 5% gelatin, 15% whey protein concentrate, 80% water. This mixture had a viscosity of approximately $10^7$ centipose at 5.5° C. The gelatin was Atlantic Gelatin type A gelatin and the whey protein concentrate was Borden Industrial Food Products calcium protolac.

The glaze was applied to the exterior of fresh dough and canned. After a 90 day shelf life, the dough was removed from the can and baked. The product exhibited moderate to high sheen.

Another glaze was made by forming a dispersion of the following ingredients given in weight percent. The method of forming the dispersion was that similar to the method disclosed in U.S. Pat. No. 4,031,261. The ingredients were 50% soy bean oil, 27.5% water, 17.5% egg albumin and 5% glycerin. The dispersion was applied to the exterior of a mass of fresh dough after which the dough was canned. After a 90 day shelf life, the dough was removed from the can and baked with the dough having a high sheen on the exterior. The dispersion had a viscosity on the order of about $10^6$ centipose.

It has been found that in some cases it is desirable to cool the applied glaze so that it gels in order to facilitate packing.

An alternate method of glaze application consists of working dry film-formers (e.g. gelatin, whey protein concentrate, caseinate) on to the dough surface using, for example, a set of compression rollers. The film formers should be worked into the dough to avoid sticking to the sides of can and creating handling issues. When the film formers are applied in such manner, hydration prior to canning or baking is required to generate acceptable sheen.

In addition to food colors, flavors (e.g. artifical or natural butter) can be incorporated into the gelation-based glaze, creating a flavor impact similar to that of butter-top breads in the market after baking. Also, incorporation of flavoring into the glaze generates substantially higher aroma during baking as compared to unglazed control.

By way of specific example, the following are provided to illustrate operability of the present invention.

In order to demonstrate the effect of keeping at least one of the leavening components substantially isolated from the remainder of the leavening components the following is provided.

Two batches of dough were mixed with the same formula. The two batches however were processed differently. In a first batch all leavening components were thoroughly mixed in the flour/water matrix. The shortening was then laminated in. After about 7-10 minutes from completion of the lamination the dough had risen sufficiently that the density had decreased to about 1.0 g/cc (an acceptable packing density).

The second batch of dough was formed such that the leavening acid and base were not mixed into the flour/water matrix. The leaveners were mixed in the shortening and the shortening was then laminated into the flour/water matrix in a manner to keep the leaveners and water substantially isolated. After about 20-30 minutes from completion of the lamination the density had decreased to about 1.0 g/cc. This is about 3 times the time for the non isolated leavener mode.

In order to demonstrate the leavening effect of adding edible alcohol to dough, the following is provided.

The doughs used were the same formulations with exception of whether or not ethanol was added. The doughs were stored in the same type containers and held under pressure and were baked after 1 week and 2½ weeks of storage. The following is a tabulation of the results showing a significantly higher specific volume when ethanol was used.

|  | 1 Week | 2½ Weeks |
|---|---|---|
| Dough with no alcohol | 3.41 cc/g | 3.34 cc/g |
| Dough with 1.8% ethanol by weight of dough | 3.89 cc/g | 3.94 cc/g |

In order to illustrate the importance of lamination, product was made according to the preferred formula for bread. Product was prepared in accordance with the teachings of this invention, i.e., the flour/water matrix was mixed, then shortening and leavening agents were laminated into the flour/water matrix. The dough was sheeted to a final thickness, misted, rolled into a cylinder and canned.

For the second product, all of the ingredients in the dough formula were mixed together for the same length of time as above, and the dough was subjected to the same sheeting sequence. Since the shortening was included in the mixing step, no shortening was added in the lamination step. The cutting, rolling and canning procedures were the same as the invention prepared product.

Evaluation of these two products after baking showed that they were of equal specific volume. The crumb of the non invention mixed product had round gas cells and thick, spongy-looking cell walls and had a tender, crumbly, cake-like eating texture. The crumb of the inventive laminated product had irregularly shaped gas cells, thin cell walls, and a resilient bread-like eating texture.

Two bread products were prepared according to the formulae listed below to show the importance of the type of leavener:

| Product | 1 | 2 |
|---|---|---|
| Flour | 55% | 55% |
| Water | 31 | 31 |
| Salt | 1 | 1 |
| Sucrose | 4 | 4 |
| Fat | 5 | 5 |
| Flavoring | 1 | 2 |
| Soda | 1 | 1 |
| GDL | 2 | — |
| Sapp. | — | 1 |

The dry ingredients were preblended, the water and fat were added and the dough mixed to desired consistency for processing. Dough pieces of an appropriate size were placed in cans, sealed, and proofed to positive pressure. After two weeks, the products were baked and evaluated by a taste panel. The GDL-containing product was preferred over SAPP-containing product because of flavor. The GDL product was described as bland, sweet, bread-like, while the SAPP product was described as bitter and strongly "biscuit" flavored.

Breads produced by practice of this invention have specific volumes in the 4.2–5.5 cc/gm range which are obtained with the "slow" opening can which reduces the loss of $CO_2$ and permits the gradual expansion of dough at can opening. Conventional "fast" opening cans produce breads with specific volume averages in the 3.9 up to 4.4 range. Organoleptically, breads baked from "slow" opening cans have more bread-like characteristics—e.g., finer cell walls, larger cell size, more open structure.

It is to be understood that while there has been illustrated and described certain forms of the present invention, it is not be limited to the specific form or arrangement of parts herein described and shown except to the extent that such limitations are found in the appended claims.

What is claimed and desired to be secured by Letters Patent is:

1. A glazed dough product comprising:
   a mass of fresh dough made from cereal grain flour;
   a coating of glaze on the exterior of said dough mass, said glaze comprising a proteinaceous liquid which contains as an essential component protein having a viscosity above $10^5$ centipoise measured at 5.5° C. whereby the glaze is on the next exterior surface of the dough during storage and after baking.

2. A glazed dough product as set forth in claim 1 wherein said proteinaceous liquid contains protein in an amount in the range of between about 4% and about 25% by weight of glaze.

3. A glazed dough product as set forth in claim 2 wherein said protein is in an amount in the range of between about 6% and about 15% by weight of glaze.

4. A glazed dough product as set forth in claim 3 wherein said protein is in an amount in the range of between about 8% and about 15% by weight of glaze.

5. A glazed dough product as set forth in claim 1, 2, 3 or 4 wherein said proteinaceous liquid includes gelatin as a source of protein.

6. A glazed dough product as set forth in claim 5 wherein said proteinaceous liquid includes whey as a source of protein.

7. A glazed dough product as set forth in claim 1, 2, 3 or 4 wherein said proteinaceous liquid includes casein as a source of protein.

8. A glazed dough product as set forth in claim 1, 2, 3 or 4 wherein said glaze is applied such that the coating is present in an amount in the range of between about 0.005 g/cm² to about 0.01 g/cm².

9. A glazed dough product as set forth in claim 1, 2, 3 or 4 wherein the viscosity of the proteinaceous liquid is above $10^6$ centipoise as measured at 5.5° C.

10. A glazed dough product as set forth in claim 1, 2, 3 or 4 wherein the proteinaceous liquid has a viscosity above $10^7$ centipoise as measured at 5.5° C.

* * * * *